Patented Aug. 27, 1946

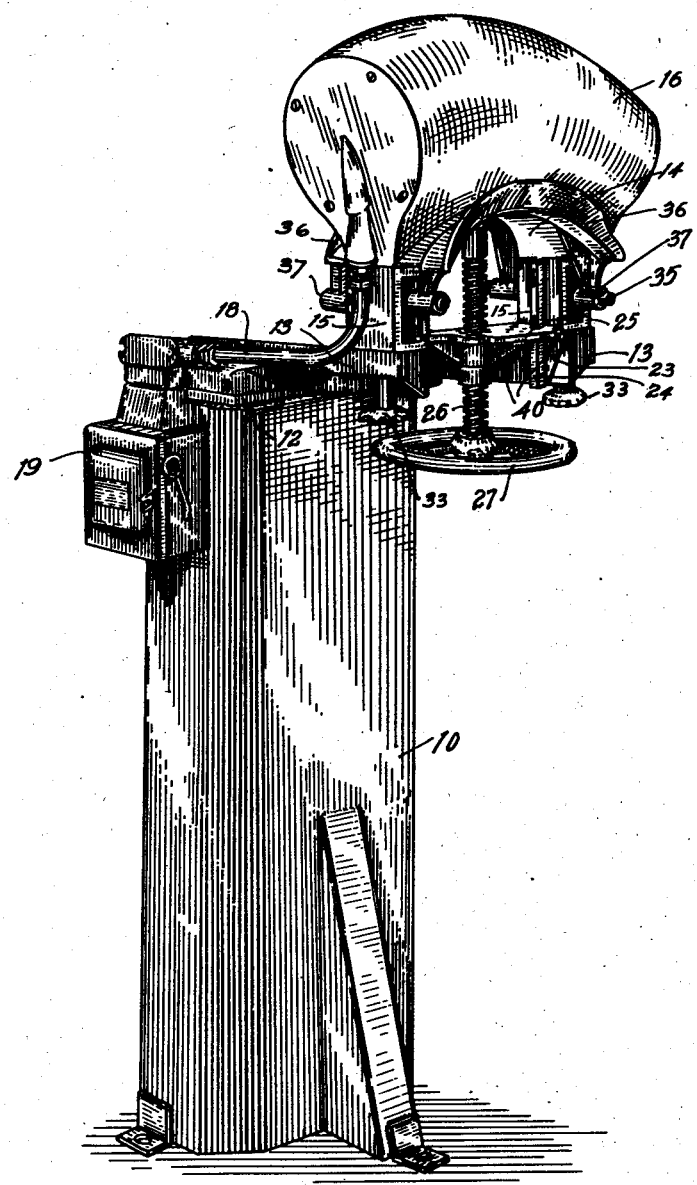

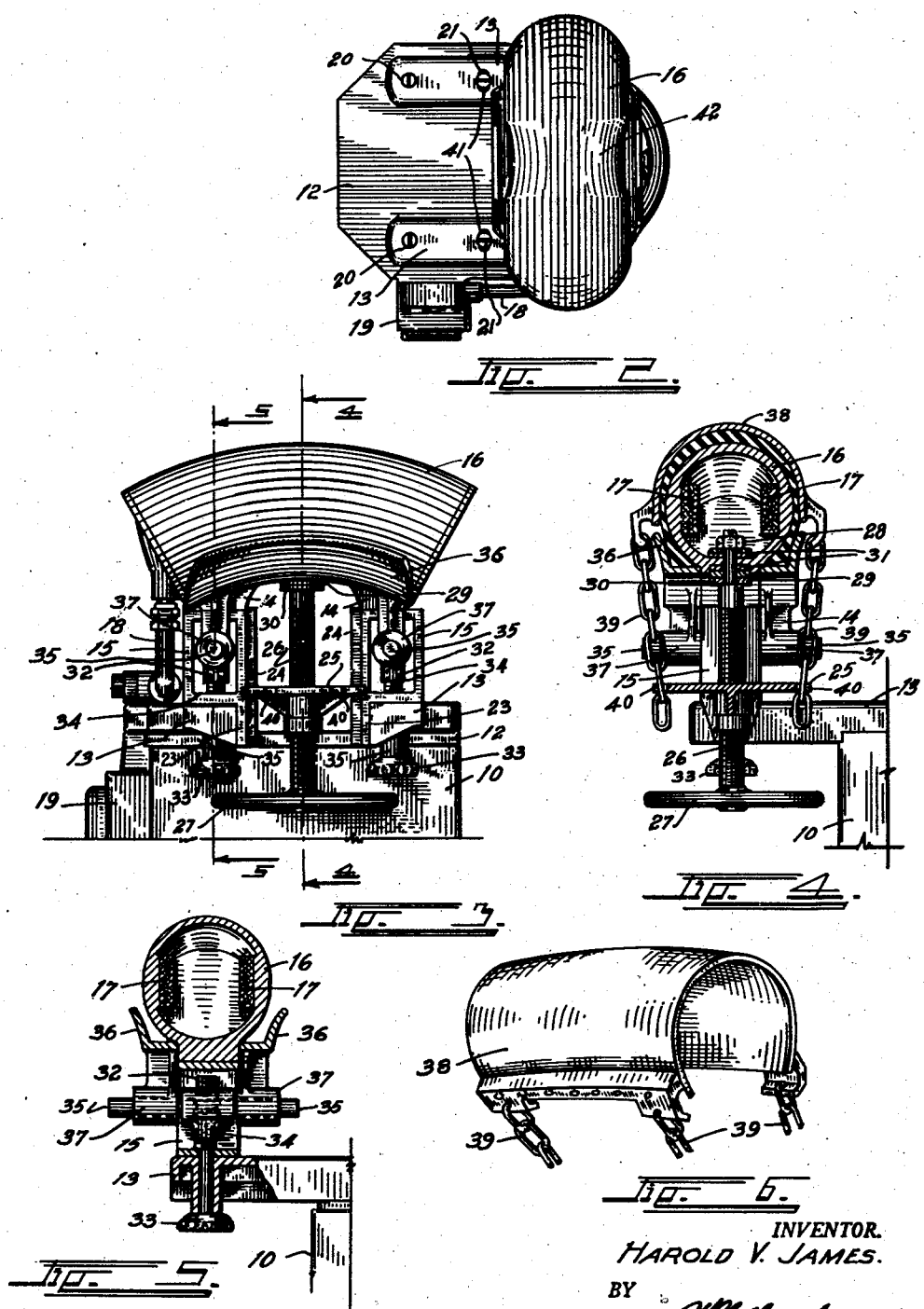

2,406,498

UNITED STATES PATENT OFFICE 2,406,498

TIRE CASING VULCANIZER

Harold V. James, Denver, Colo.

Application April 9, 1945, Serial No. 587,330

3 Claims. (Cl. 18—18)

This invention relates to a tire casing vulcanizer, more particularly for what is known as "spot repairs." The principal object of the invention is to provide a sturdy device upon which the casings can be easily placed and removed without damage to the vulcanizer, and with very little effort on the part of the operator.

Another object of the invention is to provide easily adjustable means for supporting the casing on the curing arm at its bead portion so as to prevent stretching and distorting of the repair.

Still another object is to provide a curing arm contoured so as to prevent the formation of bulges in the casing due to internal plies or patches.

Other objects and advantages reside in the detail construction of the invention, which is designed for simplicity, economy, and efficiency. These will become more apparent from the following description.

In the following detailed description of the invention, reference is had to the accompanying drawings which form a part hereof. Like numerals refer to like parts in all views of the drawings and throughout the description.

In the drawings:

Fig. 1 is a perspective view of the improved tire casing repair device;

Fig. 2 is a plan view thereof;

Fig. 3 is a front view;

Fig. 4 is a vertical section taken on the line 4—4, Fig. 3;

Fig. 5 is a cross-section taken on the line 5—5, Fig. 3; and

Fig. 6 is a detail perspective view illustrating one type of clamping band which may be used in connection with the improved vulcanizer.

The device is supported upon a pedestal 10 which is preferably formed of steel plate material so as to form a hollow interior in which suitable shelves (not shown) may be placed for conveniently supporting tools and other accessories. A cap plate 12 closes the top of the pedestal.

Two spaced-apart supporting arms 13 are secured on top of the cap plate 12 by means of suitable attachment screws 20 and project forwardly therefrom in parallel relation.

A hollow post 15 is secured on top of the projecting extremity of each of the arms 13. The posts 15 support an arcuate curing arm 16. The curing arm is formed with a base lug 14 adjacent each of its extremities, which rest upon the posts 15.

The curing arm may have any desired provision for heating. As illustrated, it is an electrically-heated arm provided with electric heating elements 17 on its interior. Conductors carrying current to the heating elements 17 pass through a conduit 18 to a suitable switch box 19.

The posts 15 are formed with downwardly depending apron portions 23 which overlap the inside faces of the arms 13. A vertical tenon 24 extends downwardly along each post 15 and its apron 23. The tenons are for the purpose of guiding a horizontal pressure plate 25, the extremities of which are notched to ride on the tenons 24.

The pressure plate is threaded on and supported from a central jack screw 26, terminating at its lower extremity in a hand wheel 27. The upper extremity of the jack screw 26 is reduced in diameter and passes through the bottom of the curing arm 16, terminating in a suitable combination nut and washer 28. The upward thrust of the jack screw is absorbed by a bronze washer 29 positioned between two steel washers 30. The downward thrust is received by a steel washer 31 on the interior of the curing arm 16.

An adjusting screw 32 is mounted in each of the posts 15 and extends vertically downward therein, the lower extremity being reduced in diameter to provide a bearing shoulder in the post. A hand knob 33 is secured on the lower extremity of each screw 32 by means of which it may be rotated. A nut 34 is threaded onto each of the adjusting screws 32 within the posts 15. The nut is provided with two oppositely-extending studs 35 which project forwardly and rearwardly through openings in the sides on the posts 15.

An arcuate bead arm 36 is supported by the studs 35 at the front and back of the curing arm 16. The bead arms have a contour to conform to the external contour of a typical tire casing bead portion, and are provided with sleeves 37 which slide over the studs 35.

A clamping band 38, such as illustrated in Fig. 6, is employed in connection with the device. The clamping band consists of an arcuate flexible metallic hood conforming to the outer contour of a typical casing. A link chain 39 depends from adjacent each corner of the band as illustrated in applicant's United States Patent No. 2,112,440. The pressure plate 25 is provided with chain notches 40 into which the links of the chains 39 are engaged.

In use, the tire casing to be repaired is hung over the curing arm 16, with the repaired portion substantially at the mid-point thereof. The screws 32 are adjusted to raise or lower the bead arms 36 against the heads of the casing so that they will support the latter uniformly throughout the length of the repaired portion to prevent the weight of the casing from widening, stretching, and distorting the repair.

The clamping band 38 is placed over the repair, the chains 39 are drawn tightly by hand, and links thereof are engaged in the four chain notches 40 of the plate 25. The hand wheel 27 is then rotated to pull the pressure plate downwardly, thus placing the chains under tension and clamping the band 38 snugly against the repair, and the latter snugly against the curing arm 16.

The curing is effected as usual by the heat of the curing arm 16. When the repair is completed the hand wheel 27 is rotated to raise the pressure plate 25 so as to release the chains 39 to allow the links to be slipped from the notches 40 so that the clamping band 38 may be removed.

There is, of course, a slight lineal expansive and contractive movement of the curing arm 16 due to variations in temperature therein. This movement causes the supporting arms 13 to move toward or away from each other, and is accommodated by means of slotted bolt holes 41 in the arms, through which the attachment bolts 20 pass.

In the usual curing arm the plies or layers of repair material on the inside of the casing force the latter outwardly to create a bulge therein. This improved curing arm, however, has an arcuate depression 42 about its middle which accommodates the internal plies or patches and prevents them from forcing the casing contour outwardly to form a bulge. The depression 42 extends completely around the casing-engaging portions of the curing arm, as shown in Fig. 2.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:

1. A tire casing repair device comprising: a pedestal; a pair of supporting arms detachably secured to said pedestal and extending forwardly therefrom; a supporting member mounted on the projecting extremity of each arm; an arcuate curing arm extending between the supporting members and being secured thereto adjacent each of its extremities; a jack screw rotatably suspended from the mid-portion of said curing arm between the supporting members; a pressure plate threaded on said jack screw; a clamping band extending over said curing arm; means for connecting said clamping band to said pressure plate; a vertical tenon formed on each of said supporting members, the tenons on the opposite members facing each other; and notches in said pressure plate for engaging said tenons to prevent rotation of said pressure plate.

2. A tire casing repair device comprising: a pedestal; a pair of supporting arms detachably secured to said pedestal and extending forwardly therefrom; a supporting member mounted on the projecting extremity of each arm; an arcuate curing arm extending between the supporting members and being secured thereto adjacent each of its extremities; a jack screw rotatably suspended from the mid-portion of said curing arm between supporting members; a pressure plate threaded on said jack screw; a clamping band extending over said curing arm; link chains extending from said clamping band into chain-engaging means in said pressure plate, said supporting members being hollow; a vertical adjusting screw in each of said supporting members; a nut threaded on each adjusting screw; studs projecting forwardly and rearwardly from each nut and from said supporting members; and an arcuate bead iron extending between the studs and being supported thereby at each side of said curing arm.

3. A tire casing repair device comprising: a pedestal; a pair of supporting arms detachably secured to said pedestal and extending forwardly therefrom; a supporting member mounted on the projecting extremity of each arm; an arcuate curing arm extending between the supporting members and being secured thereto adjacent each of its extremities; a vertical adjusting screw in each of said supporting members; a nut threaded on each adjusting screw; studs projecting forwardly and rearwardly from each nut and from said supporting members; an arcuate bead iron extending between the studs and being supported thereby at each side of said curing arm; and means for drawing a tire casing against said curing arm.

HAROLD V. JAMES.